United States Patent

Martin

[15] 3,681,353
[45] Aug. 1, 1972

[54] CHARGE-TRANSFER COMPLEXES OF FLUORO-AND CYANO-SUBSTITUTED TETRACYANQUINODIMETHANS

[72] Inventor: Elmore Louis Martin, Wilmington, Del.

[73] Assignee: E. I. du Pont de Nemours and Company, Wilmington, Del.

[22] Filed: Nov. 25, 1970

[21] Appl. No.: 92,952

Related U.S. Application Data

[63] Continuation-in-part of Ser. No. 664,315, Aug. 30, 1967, Pat. No. 3,558,671, which is a continuation-in-part of Ser. No. 514,385, Dec. 16, 1965, Pat. No. 3,504,001.

[52] U.S. Cl. ..................260/267, 8/55, 260/247, 260/283 CN, 260/286 R, 260/294.9, 260/396 N, 260/430, 260/438.1, 260/439 R

[51] Int. Cl. ..................C07d 51/80, C07d 33/50

[58] Field of Search ............260/267, 283 CN, 396 N

[56] References Cited

UNITED STATES PATENTS

| | | | |
|---|---|---|---|
| 3,162,641 | 12/1964 | Acker et al. | 260/283 CN |
| 3,334,109 | 8/1967 | Harris | 260/283 CN |
| 3,408,367 | 10/1968 | Andreaedes | 260/396 N |
| 3,504,001 | 3/1970 | Martin | 260/396 N |
| 3,441,505 | 4/1969 | Schmiedel | 260/283 CN |
| 3,526,497 | 9/1970 | Obreiter | 260/396 N |
| 3,558,671 | 1/1971 | Martin | 260/286 R |

*Primary Examiner*—Donald G. Daus
*Attorney*—D. R. J. Boyd

[57] ABSTRACT

Charge-transfer compounds of the formula $$M^{n+}(STCNQ^-)_n(STCNQ^\circ)_b$$

wherein M is a cation of valance $n+$ when $n$ is from 1 to 6, STCNQ is a tetracyanoquinolium substituted in the ring with at least two substitutents which can be fluorine or cyano, $-$ denotes a negative charge, $\cdot$ denotes an unpaired electron, $\circ$ indicates a neutral species, and $b$ is a number from 0 to 3 including fractions, are useful as pigments in lacquers and for dying nylon, wool and silk.

16 Claims, No Drawings

CHARGE-TRANSFER COMPLEXES OF FLUORO- AND CYANO-SUBSTITUTED TETRACYANOQUINODIMETHANS

RELATED APPLICATIONS

This application is a continuation-in-part of application Ser. No. 664,315 filed Aug. 30, 1967 now U.S. Pat. No 3,558,671 granted Jan. 26, 1971 which is a continuation-in-part of application Ser. No. 514,385 filed Dec. 16, 1965, issued Mar. 31, 1970 as U.S. Pat. No. 3,504,001.

FIELD OF THE INVENTION

This invention relates to charge-transfer complexes useful as pigments and dyestuffs.

SUMMARY OF THE INVENTION

The products of the present invention have the formula $$M^{n+}(STCNQ^-)_n(STCNQ^°)_b$$

wherein $n+$ is the valence of cation M and can be from 1 to 6, $b$ is a number including fractions from 0 to 3, — represents a negative charge, · represents an unpaired electron, ° indicates a neutral species and STCNQ represents a quinodimethan of the formula

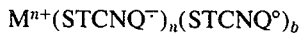  (I)

wherein A, B, D and E are hydrogen, fluorine or a cyano group (—CN) with the proviso that no more than two of A, B, D and E are hydrogen.

A special class of the above compounds are those wherein $b$ is 0, i.e., compounds of the formula $$M^{n+}(STNQ^-)_n$$

DETAILED DESCRIPTION OF THE INVENTION

The products of the present invention are charge transfer complexes of fluoro- and cyano-substituted 1,4-bis-(dicyanomethylene)cyclohexadienes of the formula

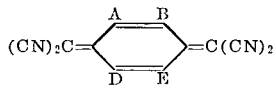

The substituted 1,4-bis(dicyanomethylene)cyclohexadienes of formula I, or the substituted tetracyanoquinodimethans as they are alternatively called and which can be represented by the symbols STCNQ for brevity, can be prepared by the following three-step process. In the first step, a 1,4-bis(dicyanomethyl)-substituted benzene of the formula

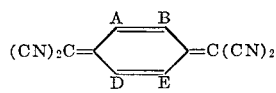  (II)

wherein A, B, D, and E are as defined above and R is hydrogen or the group

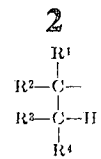

where $R^1$, $R^2$, $R^3$ and $R^4$ are the same or different and are hydrogen, hydrocarbyl of one to 10 carbon atoms and free of aliphatic unsaturation, or hydrocarbyl of one to 10 carbons free of aliphatic unsaturation and substituted with Cl, —N(CH$_3$)$_2$, —OCH$_3$, —CN, —COOalkyl, and the like, groups is prepared by the reaction of a substituted malononitrile of the formula

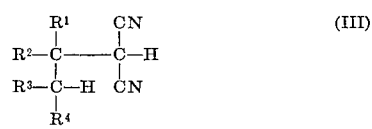  (III)

where $R^1$, $R^2$, $R^3$ and $R^4$ are the same or different and are as defined above, with an alkali or alkaline earth metal, alkali metal or alkaline earth metal hydride, or alkali metal or alkaline earth metal hydrocarbyl oxide and a substituted benzene of the formula

  (IV)

wherein the X's are fluorine, chlorine, bromine, or iodine and A, B, D, and E are as defined previously, in the presence of an inert, anhydrous, aprotic liquid reaction medium, e.g., ethylene glycol dimethyl ether (glyme), tetrahydrofuran, diethyl ether, dioxane, dimethyl sulfoxide, N,N-dimethylformamide, tetramethylene sulfone, etc., at a temperature of 0° to 100° C., preferably at 10°–15° C., and the resulting solution is then heated to 40°–90° C. in an inert atmosphere, e.g., in an atmosphere of nitrogen, for several hours, e.g., 1–24 hours. After cooling, the reaction mixture is diluted with a large volume of water and the resulting solid reaction product is filtered from the reaction mixture. This product has the general formula

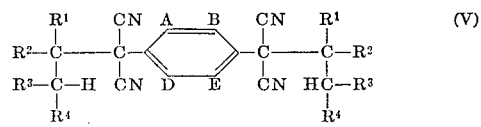  (V)

This product, which is the precursor for the substituted tetracyanoquinodimethan and which can be termed STCNQ(P) for brevity, can be purified by conventional methods, e.g., by washing with suitable diluents and by crystallization from suitable solvents.

Specific alkaline materials suitable for reaction with the monosubstituted malononitriles in the above-described process include metallic lithium, sodium and potassium; lithium, potassium and sodium hydrides; the lower alkoxides of lithium, sodium and potassium; sodium triphenylmethyl; butyllithium; and sodium phenyl.

In the second step of the process, the STCNQ(P) is heated to an elevated temperature to decompose it to the corresponding substituted 1,4-bis(dicyanomethyl)benzene, or alternatively the substituted dihydrotetracyanoquinodimethan, which can be termed STCNQH$_2$ for brevity, of the formula

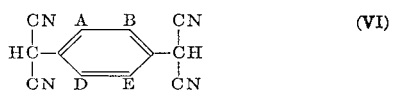
(VI)

and an olefin. The temperature required to decompose the quinodimethan precursor to the dihydroquinodimethan is dependent on the thermal stability of the precursor. The temperature should be sufficiently high to cause the precursor to decompose to the dihydroquinodimethan and an olefin at a practical rate but not so high as to cause excessive decomposition of the resulting dihydroquinodimethan. A suitable temperature range is 200°–300° C., with 220°–260° C. being preferable. When a reaction temperature in the upper portion of the operable range is employed, reaction takes place almost instantaneously. In the preferred temperature range with a batch process on a laboratory scale, reaction times of 1–5 minutes are sufficient. Shorter reaction times can be used at higher temperatures and are preferred, especially when the process is conducted on a continuous basis. Longer reaction times are required when the decomposition is carried out in the lower portion of the above operable range.

The decomposition of the STCNQ precursor can be carried out in any reaction medium that does not react with the precursor or the resulting dihydroquinodimethan. Suitable reaction media include hydrocarbons, ethers, esters, amides, lactones, lactams, ketones, alcohols, chlorinated hydrocarbons, and the like. The preferred reaction media are the aromatic hydrocarbons, aromatic ketones, aromatic ethers and alkyl esters of carboxylic acids, e.g., biphenyl, diphenylmethane, benzophenone, phenyl ether, dibenzofuran, dimethyl phthalate, and the like. The reaction medium selected must be one that boils at or above the decomposition temperature of the reactant when the reaction is carried out at atmospheric pressure. However, lower boiling reaction media can be used if the decomposition is carried out under superatmospheric pressure. The reaction can also be carried out in the vapor phase either at atmospheric or reduced pressures. Optionally a carrier material such as nitrogen, helium, benzene, etc., may also be used in the process. Also a heat transfer material such as glass beads, solid polytetrafluoroethylene resin, and the like, may also be used. The ratio of the STCNQ precursor to the reaction medium employed is not critical, and the reaction can be carried out under heterogenous or homogeneous conditions. However, it is preferred that the precursor be essentially completely soluble in the reaction medium at the decomposition temperature. In general, 1–10 parts of STCNQ precursor to 100 parts of reaction medium is preferred.

The substituted dihydroquinodimethan, STCNQH$_2$, can be isolated from the reaction medium by any convenient method. For example, it can be extracted from the reaction medium by the use of an aqueous solution of an alkali metal hydroxide, carbonate, or bicarbonate, and precipitated from the resulting aqueous solution by acidification. The reaction medium may be removed by distillation under reduced pressure and the residual dihydroquinodimethan purified by crystallization or converted directly to the quinodimethan as described in further detail below. The reaction medium can also be cooled and the reaction product isolated by filtration.

The cyano- and fluoro-substituted dihydroquinodimethans form salts with quaternary ammonium halides which are useful as dyes. Thus, the colored quaternary ammonium salts of these STCNQH$_2$'s can be used to dye various fabrics, e.g., nylon, wool, silk, etc.

In the third step of the process, the substituted dihydrotetracyanoquinodimethan can be oxidized to the substituted tetracyanoquinodimethan by treatment with a convenient oxidizing agent such as chlorine, bromine, nitric acid (usually in admixture with another strong mineral acid such as hydrochloric acid) at ordinary or moderately elevated temperatures, e.g., 25°–100° C. Such oxidation procedures are described in U.S. Pat. No. 3,115,506. The resulting substituted tetracyanoquinodimethan, STCNQ, can be isolated and purified, if desired, by conventional methods. For example, the STCNQ can be purified by washing and by crystallization from a suitable organic solvent, e.g., methylene chloride.

As indicated previously, the STCNQH$_2$ need not be isolated from its reaction solution prior to oxidation. If desired, the neutralized aqueous alkaline extract of the decomposition mixture can be used directly in the third or oxidation, step.

The substituted malononitriles of formula III and the substituted benzenes of formula IV used as starting materials in preparing the compounds of this invention are themselves known compounds or can be prepared by well-known methods. See U.S. Pat. Nos. 3,166,583 and 3,179,692 for detailed procedures.

The substituted tetracyanoquinodimethans of this invention can also be prepared by an alternative process comprising reaction of a p-xylylene dicyanide having 2–4 fluorine or cyano (—CN) substituents on the benzene ring with a dihydrocarbyl, preferably dialkyl, carbonate and an alkali or alkaline earth metal hydrocarbyl oxide in the presence of an inert organic diluent, e.g., a hydrocarbon, at a temperature of 25°–200° C., preferably at the reflux temperature of the reaction mixture being employed. The resulting metal derivative of the dicyanophenylenebisacetate is then reacted with a cyanogen halide at a temperature of 5°–25 C. during the first exothermic portion of the reaction and finally at a temperature of 50°–75° C. to complete the reaction. This produces a tetracyanophenylenebisacetate, which on hydrolysis and decarboxylation at temperatures ranging from 20° to 100° C., is converted to the substituted dihydrotetracyanoquinodimethan. The latter compound can then be oxidized by the oxidation methods described hereinbefore to yield the substituted tetracyanoquinodimethan. This series of reactions is illustrated by the following equations:

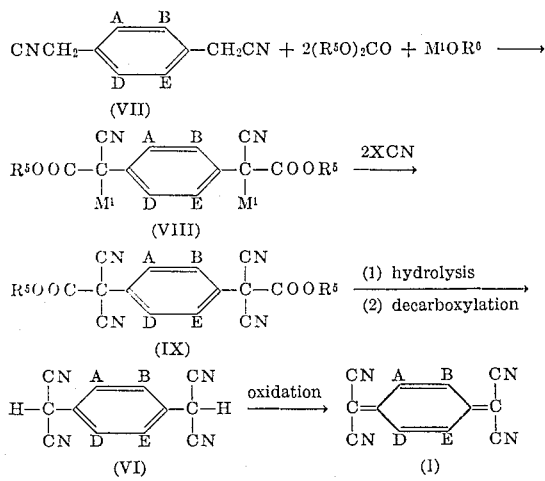

In these formulas R[5] and R[6] are hydrocarbyl, preferably alkyl; M[1] is an alkali metal or alkaline earth metal; and X is a halogen, e.g., chlorine, bromine, or iodine; and A, B, D, and E have the meanings defined hereinbefore.

This alternative process is described in greater detail in my U.S. Pat. No. 3,504,001 issued Mar. 31, 1970.

The 1,4Bis(dicyanomethylene)-substituted cyclohexadienes, or as they can be alternatively named, fluoro- and/or cyano-substituted 7,7,8,8-tetracyanoquinodimethans, form charge-transfer compounds with Lewis bases broadly, including specifically organic and organo-inorganic Lewis bases. The charge-transfer compounds of the substituted tetracyanoquinodimethans (STCNQ, for brevity) with Lewis bases range in degree of charge-transfer from those of true complex structure to those where actual and complete charge-transfer exists in the ground electrical state. Compounds of the last-mentioned type constitute so-called anion-radical salts wherein at least one molecule of STCNQ carries at least one transferred electron, and accordingly a negative electronic charge, and at least one molecule of the Lewis base component will have donated at least one electron to the STCNQ component and will accordingly have an electron deficiency, and, therefore, a positive electronic charge. The invention is generic to those charge-transfer compounds of STCNQ with Lewis bases which exhibit a detectable paramagnetic resonance absorption under normal conditions. It is likewise generic to STCNQ charge-transfer compounds wherein the maximum charge-transfer occurs not in the ground electronic state but rather in the excited state (see Orgel, Quart. Rev. Chem. 8, 1422 (1954) for a discussion of this type of normally diamagnetic charge-transfer compounds).

The charge transfer compounds of STCNQ with Lewis acids are generically described by the formula

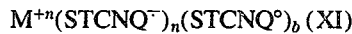

wherein STCNQ, as is so throughout this specification, represents generically the various fluorine- and cyano-substituted TCNQ's as defined hereinbefore; $n$ is the formal positive charge on the cation M, and is also the number of (STCNQ[-]) moieties present, the charge-transfer compound being overall electrically neutral, and is an integer from 1 to 6, $b$ is a number from 0 to 3 including fractions representing the number of neutral STCNQ species combined in the charge-transfer compound. The superscript ° indicates a neutral species; − indicates a negative charge and · an unpaired electron. This formula includes charge-transfer compounds of the type $$M^{+n}(STCNQ^{-})_n \quad (X)$$

in which no neutral species are present and charge-transfer compounds in which up to three neutral species are combined.

As shown in the above formulas, the STCNQ species collectively associated with a cation contain a number of unpaired electrons equal to the formal charge on the cation. These unpaired electrons are believed to be distributed over all the STCNQ species whether represented as formally neutral or formally containing an unpaired electron. That is, the unpaired electrons are believed to be not localized on a single carbon atom or even on a single STCNQ group. As is conventional, the above classical formulas are intended to represent such non-classical structures.

Lewis bases which, with STCNQ, form the necessary second component for forming the charge-transfer compounds of STCNQ are well known to the chemical art (see G. N. Lewis, J. Franklin Institute 226, 293 (1938) and following papers by Lewis and several coauthors). Broadly speaking, the Lewis base is, by definition, simply a molecule, the structure or configuration of which, electronically speaking, is so arranged that the molecule is capable of donating one or more electrons to a molecule which has an electron-deficient structure. Many and varied electron donor compounds are known. Well-recognized classes of Lewis bases, and many specific examples of such bases, are listed in U.S. Pat. No. 3,162,641. Any of these particular Lewis bases are equally operable in forming the charge-transfer complexes of the STCNQ's of the present invention.

The charge-transfer compounds of the present invention in which the STCNQ moiety is present wholly in ion-radical form, i.e., charge-transfer compounds of formula X, are best described as simple salts of STCNQ anion-radicals, i.e., STCNQ[-]. The cations in these simple charge-transfer anion-radical slats are equally well organic or inorganic cations. Physically, the members of this class of charge-transfer compounds are distinguished by electrical resistivities of the order of magnitude of $1 \times 10^3$ ohm-cm. or greater. Salts of STCNQ[-] with organic cations exhibit especially high electrical resistivities of the order of $1 \times 10^7$ to $1 \times 10^{11}$ ohm-cm. These salts can be used to dye nylon, wool and silk because of the presence of basic groups in these materials that form salts with the charge-transfer compounds.

These simple salts can be prepared directly by simple interaction between a suitable source of the desired cation and the substituted tetracyanoquinodimethan, or preferably by metathetic reaction between a suitable source of a cation and a convenient source of the STCNQ anion-radical. Thus, alkali metal salts of the substituted tetracyanoquinodimethans are easily prepared directly from a suitable alkali metal salt, e.g., sodium iodide, and the fluoro- or cyano-substituted tetracyanoquinodimethan in an inert reaction medium, e.g., anhydrous acetonitrile, at ordinary or moderately elevated temperatures, e.g., at the reflux temperature of the reaction mixture. The alkali metal STCNQ[-] salt formed is insoluble in the cold reaction mixture, e.g., at 0°–10 C., and can be isolated by conventional means, e.g., by filtration followed by washing and drying. This procedure crystals described by L. R. Melby et al. J. Am. Chem. Soc. 84, 3374 (1965), for the preparation of TCNQ salts.

The simple alkali metal salts of the STCNQ anion-radical are conveniently used as starting materials for metathetical reactions with other cation salts to form salts of STCNQ⁻ with other than alkali metals, e.g., with alkaline earth or heavy metals and with organic cations, e.g., quaternary ammonium and cyclic amine salts. In these metathetical reactions a source of the desired cation and a suitable reaction medium are selected so that the desired salt of the STCNQ⁻ precipitates from the reaction mixture. Thus, for example, a solution of Na⁺(STCNQ⁻) in a mixture of acetonitrile and water is treated with an excess of aqueous tetramethylammonium chloride whereupon crystals of the desired (CH$_3$)$_4$N⁺(STCNQ⁻) precipitate from the reaction mixture.

The second class of charge-transfer compounds of the fluoro- and cyano-substituted tetracyanoquinodimethans, i.e., those of formula XI, contain, in addition to the requisite stoichiometric amount of STCNQ⁻ to achieve electrical neutrality, additional combined proportions of neutral STCNQ. This class of charge-transfer compounds can be prepared under temperature and concentration conditions and, in general, in the same solvent systems, as discussed above for the simple anion-radical salts. In most instances, these salts involving the combined neutral STCNQ will be more readily obtained with organic cations. With such cations, these salts can be obtained by reaction of a salt of the desired organic cation with the substituted tetracyanoquinodimethan, e.g., by reaction of quinolinium (STCNQ⁻) with additional STCNQ at ordinary or moderately elevated temperatures. After the reaction is completed, the reaction mixture can be cooled, e.g., to 0°–10 C., whereby the crystals of the STCNQ anion-radical salt containing combined neutral STCNQ precipitate from the reaction mixture. The crystals can be isolated from the reaction mixture by conventional means, e.g., by filtration, etc.

The charge-transfer compounds of this invention are deeply colored; consequently they are useful for various purposes. Thus, the crystals of the charge-transfer compounds can be used as pearlescent materials in otherwise colorless plastics, or as pearlescent pigment materials in decorative lacquers and plastic solutions, and for dyeing nylon, wool and silk.

The products of this invention are illustrated in the following examples, which should not however be construed as fully delineating the scope of the discovery.

EXAMPLE I

Part A — Preparation of 2,3,5,6-Tetrafluoro-1,4-bis-(α—METHYLBENZYLDICYANOMETHYL)benzene

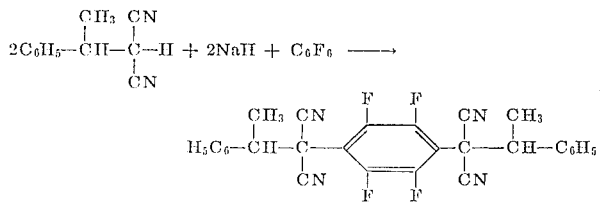

To a stirred suspension of 15.8 parts of sodium hydride in 200 parts of anhydrous ethylene glycol dimethyl ether (glyme) was added dropwise at 10°–15° C. a solution of 112 parts of α-methylbenzylmalononitrile in 150 parts of glyme. To the resulting homogeneous solution was added 56 parts of hexafluorobenzene and the reaction mixture was refluxed under an atmosphere of nitrogen for a period of 8 hours. The reaction mixture was cooled and diluted with a large volume of cold water. The 2,4,5,6-tetrafluoro-1,4-bis(α-methylbenzyldicyanomethyl)benzene was collected, washed first with water, then methanol, and finally with ether and gave 69 parts of a nearly colorless product. Crystallization from methylene chloride gave colorless crystals, m.p. 241°–243° C. with decomposition.

Anal. Calcd. for $C_{28}H_{18}N_4F_4$:
C, 69.13%; H, 3.72%; N, 11.52%; F, 15.62%
Found: C, 68.98%; H, 3.68%; N, 11.66%; F, 15.33%

Part B — Preparation of 7,7,8,8-Tetracyano-2,3,5,6-tetrafluoroquinodimethan (TCNQF$_4$)

A mixture of one part of 2,3,5,6-tetrafluoro-1,4-bis(α-methylbenzyldicyanomethyl)benzene in 20 parts of Dowtherm A (a commercial mixture of diphenyl and diphenyl ether boiling at 255° C. at 760 mm. pressure) was heated to reflux rapidly and maintained at reflux for 1 minute. The resulting solution was cooled rapidly to 40° C. and diluted with an equal volume of ether. The resulting solution was extracted with about 50 parts of a 5 percent potassium hydroxide solution, the aqueous layer was neutralized with 6N hydrochloric acid and bromine water was added until a positive test for free bromine was obtained. The resulting yellow precipitate was collected, washed with water and crystallized from methylene chloride to give yellow crystals of 7,7,8,8-tetracyano-2,3,5,6-tetrafluoroquinodimethan, m.p. 295°–300° C. with decomposition.

Anal. Calcd. for $C_{12}N_4F_4$:
C, 52.20%; H, 0.00%; N, 20.29%; F, 27.52%
Found: C, 52.03%; H, 0.00%; N, 20.17%; F, 27.43%

EXAMPLE II

Part A — Preparation of 2,3,5,6-Tetrafluoro-1,4-bis-(tert-butyldicyanomethyl)benzene

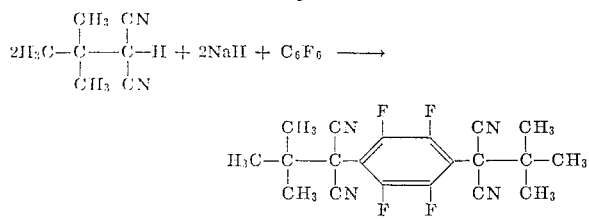

To a mechanically stirred suspension of 28.8 parts of sodium hydride in 300 parts of anhydrous glyme was added dropwise at 10°–15° C. a solution of 150 parts of tertbutylmalononitrile in 150 parts of glyme. To the resulting homogeneous solution was added 93 parts of hexafluorobenzene and the reaction mixture was refluxed for 7 hours, during which time a colorless solid separated. The reaction mixture was diluted with water, the crude 2,3,5,6-tetrafluoro-1,4-bis(tert-butyldicyanomethyl)benzene was collected, washed in turn with water, methanol and ether. The yield of nearly colorless crystals was 157 parts. Crystallization from a large volume of acetone gave colorless crystals, m.p. about 285° C. with decomposition.

Anal. Calcd. for $C_{20}H_{18}N_4F_4$:
C, 61.53%; H, 4.65%; N, 14.35%; F, 19.47%
Found: C, 61.58%; H, 4.61%; N, 14.47%; F, 19.44%

Part B — Preparation of 2,3,5,6-Tetrafluoro-1,4-bis-(dicyanomethyl)benzene ($TCNQF_4H_2$)

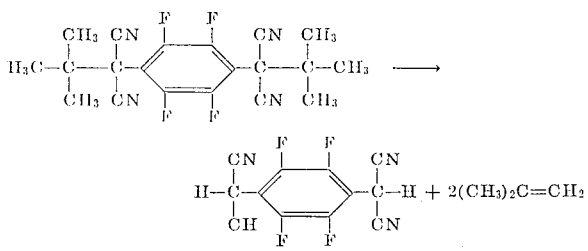

To 100 parts of diphenyl ether heated to reflux was added rapidly with vigorous stirring 3.9 parts of 2,3,5,6-tetrafluoro-1,4-bis(tert-butyldicyanomethyl)-benzene and the resulting solution was refluxed for 3.5 minutes. After cooling rapidly to 40° C., the reaction mixture was diluted with an equal volume of ether and extracted with 50 parts of 4 percent potassium hydroxide solution followed by three extractions with 15 parts of 2.5 percent potassium hydroxide solution. The combined aqueous layers were acidified with 6N hydrochloric acid, the precipitate was collected, washed with water and crystallized from methylene chloride. The colorless crystals of 2,3,5,6-tetrafluoro-1,4-bis(dicyanomethyl)benzene melted with decomposition at 276°–300° C.

Anal. Calcd. for $C_{12}H_2N_4F_4$:
C, 51.81%; H, 0.72%; N, 20.14%; F, 27.32%
Found: C, 51.88%; H, 1.02%; N, 19.84%; F, 27.18%

Part C — Preparation of 7,7,8,8-Tetracyano-2,3,5,6-tetrafluoroquinodimethan ($TCNQF_4$)

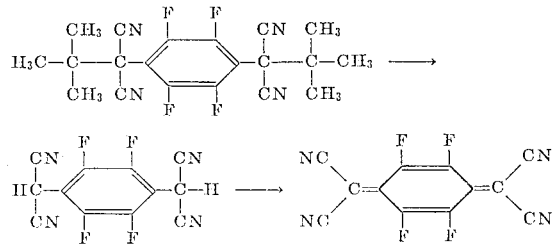

A mixture of one part of 2,3,5,6-tetrafluoro-1,4-bis(tert-butyldicyanomethyl)benzene and 20 parts of diphenyl ether was heated at reflux temperature for 3 minutes. The resulting solution was cooled rapidly to 40° C., then diluted with an equal volume of ether and extracted with 50 parts of 5 percent potassium hydroxide solution. The aqueous layer was acidified with 6N hydrochloric acid and bromine water was added until a test for free bromine was obtained. The yellow precipitate was collected, washed with water and crystallized from methylene chloride to give yellow crystals of $TCNQF_4$, m.p. 295°–300° C. with decomposition. The infrared spectrum of the product was identical with that of the sample of $TCNQF_4$ described in Example I.

EXAMPLE III

Preparation of 7,7,8,8-Tetracyano-2,3,5,6-tetrafluoroquinodimethan

To 350 parts of diphenyl ether heated to reflux and stirred mechanically was added rapidly in one portion 7.8 parts of 2,3,5,6-tetrafluoro-1,4-bis(tert-butyldicyanomethyl)benzene and the solution was refluxed for 3 minutes. The solution was cooled rapidly to 40° C., an equal volume of ether was added followed by the addition of 100 parts of a 4 percent sodium bicarbonate solution. The aqueous layer was separated, and the organic layer was extracted an additional three times with 33 parts of a 1 percent sodium bicarbonate solution. To the combined aqueous solution was added 5 parts of acetic acid and 7.5 parts of potassium acetate followed by the addition of bromine water until a positive test for free bromine was obtained. The yellow precipitate was collected, washed with water and the filter cake was dissolved in about 3,300 parts of methylene chloride. The aqueous layer was separated, the organic layer was treated with a small amount of decolorizing charcoal and dried by anhydrous magnesium sulfate. The resulting clear yellow filtrate was concentrated until a thick paste of yellow crystals of 7,7,8,8-tetracyano-2,3,5,6-tetrafluoroquinodimethan was obtained. The crystals were collected, washed with a small volume of methylene chloride, and finally washed with ether. The yield was 4.7 parts (85 percent) of yellow crystals.

EXAMPLE IV

Part A — Preparation of 2,5-Dicyano-1,4-bis(tert-butyldicyanomethyl)benzene

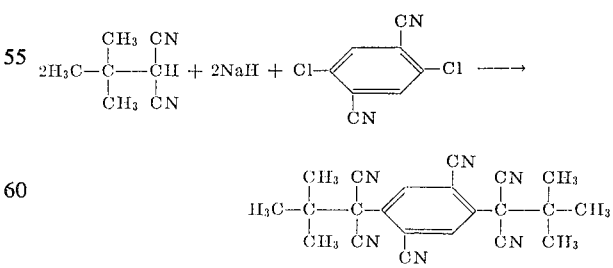

To a stirred suspension of 16.8 parts of sodium hydride in 200 parts of glyme was added at 10°–15° C. a solution of 85.4 parts of tert-butylmalononitrile in 100 parts of glyme. To the resulting solution was added 59 parts of 2,5-dichloroterephthalonitrile and the mixture was refluxed under an atmosphere of nitrogen for 20 hours, during which time colorless crystals separated. The reaction mixture was concentrated to a thick paste under reduced pressure. Water was added and the precipitate was collected and washed in turn with water, methanol, and ether. The nearly colorless 2,5-dicyano-1,4-bis(tertbutyldicyanomethyl)benzene weighed 86 parts (78 percent of theory) and crystallization from methylene chloride gave colorless crystals melting with decomposition at 265° C.

Anal. Calcd. for $C_{22}H_{20}N_6$:
C, 71.72%; H, 5.47%; N, 22.81%
Found: C, 71.39%; H, 5.31%; N, 22.58%

Part B — Preparation of Bis-tetrapropylammonium Salt of 2,5-Dicyano-1,4-bis(dicyanomethyl)benzene

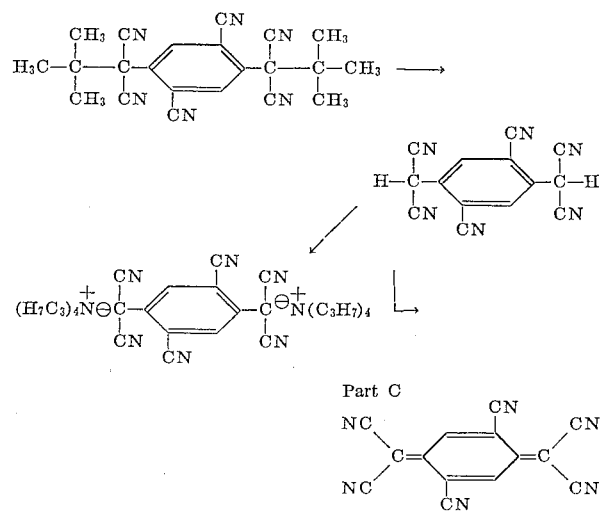

Part C

To 1,500 parts of diphenyl ether heated at 225° C. was added rapidly in one portion 18.4 parts of 2,5-dicyano-1,4-bis(tert-butyldicyanomethyl)benzene and the mixture stirred for 3 minutes. The resulting solution was cooled rapidly to 40° C., diluted with an equal volume of ether followed by addition of 1,000 parts of a 1 percent sodium bicarbonate solution. The organic layer was extracted with two portions of 150 parts of a 1 percent sodium bicarbonate solution, and the combined aqueous solutions were filtered. To the resulting deep red filtrate was added a concentrated aqueous solution of 50 parts of tetrapropylammonium iodide and the deep purple salt was collected, washed with cold water and crystallized from aqueous methanol. The yield of reddish-violet crystals, melting at 219°–225° C. with decomposition, was 53 parts. Recrystallization gave crystals of the bistetrapropylammonium salt of 2,5-dicyano-1,4-bis(dicyanomethyl)benzene melting at 226°–228° C. with decomposition. This compound dyes nylon, silk, and wool different shades of red.

Anal. Calcd. for $C_{38}H_{58}N_8$: C, 72.80%; H, 9.32%; N, 17.88%
Found: C, 73.11%; H, 8.94%; N, 18.32%

Part C — Preparation of 2,5,7,7,8,8-Hexacyanoquinodimethan (TCNQ(CN)$_2$)

To 750 parts of diphenyl ether maintained at 225° C. was added rapidly in one portion 18.4 g. of 2,5-dicyano-1,4-bis(tert-butyldicyanomethyl)benzene. After 3 minutes, the mixture was cooled rapidly to 40° C., diluted with an equal volume of ether and 300 parts of a 4 percent sodium bicarbonate solution was added. The organic layer was extracted with two portions of 150 parts of 1 percent sodium bicarbonate and the combined aqueous solutions were filtered. The deep red filtrate was neutralized with 6N hydrochloric acid and bromine water was added until a positive test for free bromine was obtained. The precipitate was collected, washed with water and air-dried. Crystallization from a large volume of acetonitrile gave brownish-yellow crystals of 2,5,7,7,8,8-hexacyanoquinodimethan.

Anal. Calcd. for $C_{14}H_2N_6$: C, 66.14%; H, 0.79%; N, 33.06%
Found: C, 65.94%; H, 0.79%; N, 33.19%

EXAMPLE V

Part A — Preparation of 2,5-Dicyano-3,6-difluoro-1,4-bis-(tert-butyldicyanomethyl)benzene

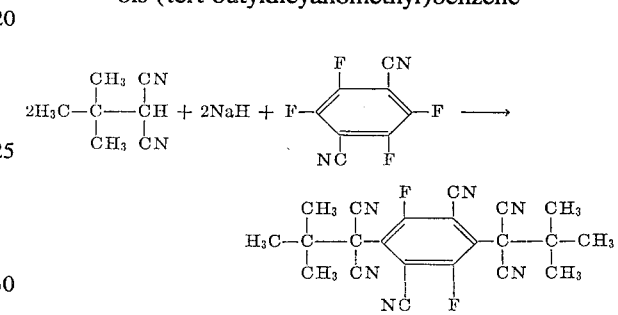

To a stirred suspension of 5.3 parts of sodium hydride in 50 parts of glyme was added dropwise at 10°–15 C. a solution of 26.8 parts of tert-butylmalononitrile in 100 parts of glyme. To the resulting solution was added 20 parts of tetrafluoroterephthalonitrile and the reaction mixture was stirred for 2 hours at 40° C. and at 50° C. for 2 hours, during which time a white solid separated. The reaction mixture was diluted with water and the filter cake was washed in turn with water, methanol and ether to give 34 parts of light yellow crystals of 2,5-dicyano-3,6-difluoro-1,4-bis(tert-butyldicyanomethyl)benzene. Crystallization from acetone gave colorless crystals, m.p. about 250° C. with decomposition.

Anal. Calcd. for $C_{22}H_{18}N_6F_2$:
C, 65.34%; H, 4.48%; N, 20.78%
Found: C, 65.20%; H, 4.60%; N, 20.79%

Part B — Preparation of Bis-tetrapropylammonium Salt of 2,5-Dicyano-3,6-difluoro-1,4-bis(dicyanomethyl)-benzene

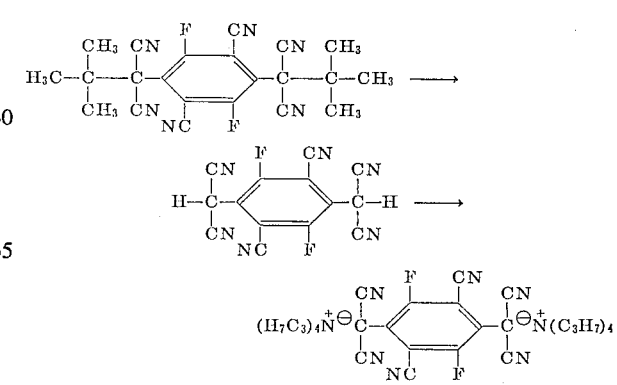

To 150 parts of diphenyl ether at 225° C. was added one part of 2,5-dicyano-3,6-difluoro-1,4-bis(tertbutyldicyanomethyl)benzene and the solution was stirred at 225° C. for 1 minute. The reaction mixture was cooled rapidly to 40° C., was diluted with an equal volume of ether and 35 parts of a 1 percent sodium bicarbonate solution was added. The organic layer was extracted with two portions of 10 parts of 1 percent sodium bicarbonate, the combined filtrates were filtered and a saturated solution of 2 parts of tetrapropylammonium iodide was added. The resulting deep red precipitate was collected, washed with water and crystallized twice from aqueous methanol to give deep purple crystals of the bis-tetrapropylammonium salt of 2,5-dicyano-3,6-difluoro-1,4-bis(dicyanomethyl)benzene. This compound dyed nylon, silk and wool shades of red.

Anal. Calcd. for $C_{38}H_{38}N_8F_2$:
C, 68.85%; H, 8.52%; N, 16.90%
Found: C, 68.56%; H, 8.50%; N, 17.23%

Part C — Preparation of 2,5,7,7,8,8-Hexacyano-3,6-difluoroquinodimethan

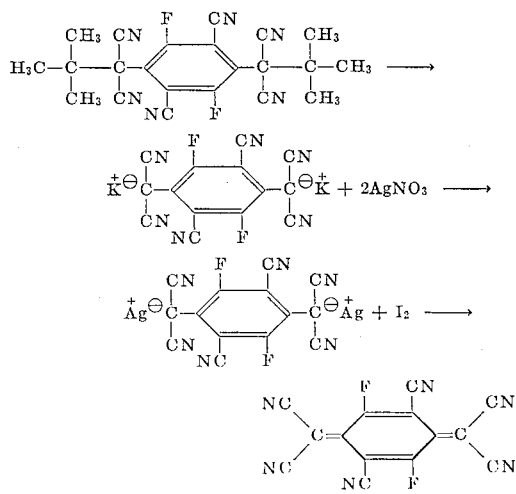

2,5-difluoro-minutes,

To 150 parts of diphenyl ether at 225° C. was added rapidly one part of 2,5-dicyano-3,6-difluoro-1,4-bis(tertbutyldicyanomethyl)benzene and the mixture was stirred at 225° C. for 1 minute. The reaction mixture was cooled rapidly to 40° C., diluted with an equal volume of diethyl ether and 35 parts of a 1 percent potassium bicarbonate solution was added. The organic layer was extracted with two portions of 10 parts each of 1 percent potassium bicarbonate solution, the combined aqueous layers were filtered and 50 parts of solid potassium chloride was added. After stirring for a few minutes, the nearly black dipotassium slat of 2,5-dicyano-3,6-difluoro-1,4bis(dicyanomethyl)benzene was collected, washed first with a small volume of 10 percent potassium chloride solution, then with a small volume of 5 percent potassium chloride solution and finally with anhydrous ether. After drying at 5° C. and 25 mm. pressure over phosphorus pentoxide, the yield was 0.85 part. To a solution of 5 parts of silver nitrate in 100 parts of water was added a filtered solution of the above dipotassium salt in 100 parts of water. The nearly black silver salt was collected and washed in turn with water, methanol and anhydrous ether. After drying, the 1.15 parts of nearly black powder was suspended in about 25 parts of anhydrous acetonitrile and a solution of 0.33 part of iodine in about 30 parts of anhydrous acetonitrile was added. The precipitated silver iodide was filtered off and washed with acetonitrile until colorless. Concentration of the filtrate under reduced pressure to a small volume gave 0.5 part of brown-yellow microscopic crystals. Crystallization of 0.1 part from about 500 parts of ethylene dichloride gave 0.05 part of 2,5,7,7,8,8-hexacyano-3,6-difluoroquinodimethan as brownish yellow crystals.

Anal. Calcd. for $C_{14}N_6F_2$:
C, 57.94%; H, 0.00%; N, 28.96%
Found: C, 57.86%; H, 0.00%; N, 28.76%

Addition of molecular silver to a solution of the quinodimethan in acetonitrile results in immediate formation of the magenta-colored dianion of 2,5-dicyano-3,6-difluoro-1,4-bis(dicyanomethyl)benzene.

EXAMPLE VI

Preparation of Sodium ($TCNQF_4^-$)

To a solution of 0.138 g. ($5 \times 10^{-4}$ moles) of 7,7,8,8-tetracyano-2,3,5,6-tetrafluoroquinodimethan ($TCNQF_4$) in 2 ml. of anhydrous acetonitrile was added a solution of 0.225 g. ($15 \times 10^{-4}$ moles) of sodium iodide in 2 ml. of anhydrous acetonitrile and the container was rinsed with 2 ml. of acetonitrile. Crystals of $Na^+(TCNQF_4^-)$ separated immediately. The mixture was allowed to stand for 2 hours at room temperature and the crystals were collected by suction filtration, washed with acetonitrile until the washings were green in color and finally washed with ether. After drying at 25° C. at 0.1 mm. over phosphorus pentoxide, there was obtained 0.15 g. of deep blue microscopic crystals of $Na^+(TCNQF_4^-)$. The electrical resistivity of a compaction of the $Na^+(TCNQF_4^-)$ at 25° C. was $2.1 \times 10^3$ ohm-cm.

Anal. Calcd. for $C_{12}N_4F_4Na$: C, 48.18%; H, 0.00%; N, 18.73%
Found: C, 48.01%; H, 0.00%; N, 18.95%

EXAMPLE VII

Preparation of Lithium ($TCNQF_4^-$)

To a solution of 0.138 g. ($5 \times 10^{+4}$ moles) of $TCNQF_4$ in 2 ml. of acetonitrile was added a solution of 0.282 g. ($15 \times 10^{+4}$ moles) of lithium iodide trihydrate in 2 ml. of acetonitrile and the container was rinsed with 1 ml. of acetonitrile. The resulting mixture was warmed on a steam bath for about 1 minute and allowed to cool to room temperature. After standing for 2 hours at room temperature, the crystals were collected, washed with acetonitrile until the washings were green in color and then with ether. After drying at 25° C. at 0.1 mm. over phosphorus pentoxide, there was obtained 0.1 g. of $Li^+(TCNQF_4^-)$. The electrical resistivity of a compaction at 25° C. was $1.6 \times 10^3$ ohm-cm.

EXAMPLE VIII

Preparation of Potassium ($TCNQF_4^-$)

To a suspension of 0.249 g. ($15 \times 10^{-4}$ moles) of finely powdered potassium iodide in 3 ml. of acetonitrile was added in solution of 0.138 g. ($5 \times 10^{-4}$ moles) of $TCNQF_4$ in 2 ml. of acetonitrile. The resulting reaction mixture was refluxed for 5 minutes and allowed to cool to room temperature. After standing for 2 hours at room temperature, the K$^+$(TCNQF$_4^-$) was collected by suction filtration, the crystals were washed with acetonitrile until the washings were green in color and finally with ether. The dried filter cake was washed with water to remove a small amount of unchanged potassium iodide and then with anhydrous ether. After drying at 25° C. over phosphorus pentoxide at 0.1 mm., there was obtained 0.14 g. of deep blue microscopic crystals of K$^+$(TCNQF$_4^-$). The electrical resistivity of a compaction of the K$^+$(TCNQF$_4^-$) at 25° C. was 4.3 × 10$^3$ ohm-cm.

Anal. Calcd. for C$_{12}$N$_4$F$_4$K: C, 45.72%; H, 0.00%; N, 17.78%
Found: C, 45.50%; H, 0.00%; N, 17.89%

EXAMPLE IX

Preparation of Cesium (TCNQF$_4^-$)

A suspension of 0.390 g. (15 × 10$^{-4}$ moles) of cesium iodide and 0.138 g. (5 × 10$^{-4}$ moles) of TCNQF$_4$ in 6 ml. of acetonitrile was refluxed gently for 5 minutes. The resulting solution was allowed to cool slowly to 25° C., then cooled in an ice-water mixture. The crystals of Cs(TCNQF$_4^-$) were collected, washed with cold acetonitrile and finally with ether. After drying over phosphorus pentoxide at 25° C. at 0.1 mm., there was obtained 0.14 g. of Cs(TCNQF$_4^-$). The electrical resistivity of a compaction at 25° C. was 2.1 × 10$^5$ ohm-cm.

EXAMPLE X

Preparation of Tetramethylammonium (TCNQF$_4^-$)

To a solution of 1 g. of sodium (TCNQF$_4^-$) in a mixture of 25 ml. of acetonitrile and 25 ml. of water was added a large excess of aqueous 10 percent tetramethylammonium chloride. The deep blue powder that formed was collected, washed first with dilute tetramethylammonium chloride, then with water and finally with ether. The yield of deep blue (H$_3$C)$_4$N$^+$ (TCNQF$_4^-$) in the form of microscopic crystals was 1.1 g. The electrical resistivity of a compaction of (H$_3$C)$_4$N (TCNQF$_4^-$) at 25° C. was 5.1 × 10$^8$ ohm-cm.

EXAMPLE XI

Preparation of Quinolinium (TCNQF$_4^-$)

To a solution of 5.16 g. (0.04 mole) of quinoline in a mixture of 200 ml. of water and 6.6 ml. of 6.1N hydrochloric acid was added slowly with stirring a filtered solution of 2.9 g. of Na$^+$(TCNQF$_4^-$) in a mixture of 25 ml. of water and 75 ml. of acetonitrile. After stirring for several minutes, the reaction mixture was diluted with water to a volume of 800 ml. and sufficient ice was added to cool the mixture to 5° C. The crystals that formed were collected, washed with ice water and finally with ether. After drying, there was obtained 3.65 g. of quinolinium (TCNQF$_4^-$). Crystallization from 75 ml. of anhydrous acetonitrile gave 3.3 g. of deep purple crystals of quinolinium (TCNQF$_4^-$). The electrical resistivity of a compaction of quinolinium (TCNQF$_4^-$) at 25° C. was 2.4 × 10$^{10}$ ohm-cm.

Anal. Calcd. for C$_{21}$H$_8$N$_5$F$_4$: C, 62.07%; H, 1.98%; N, 17.24%
Found: C, 62.24%; H, 1.90%; N, 17.23%

EXAMPLE XII

Preparation of N-Methylphenazinium (TCNQF$_4^-$)

To a solution of 2.99 g. (0.01 mole) of sodium (TCNQF$_4^-$) in a mixture of 75 ml. of acetonitrile and 75 ml. of water was added a solution of 4 g. of phenazinium methosulfate in 75 ml. of water and, after stirring for several minutes, the reaction mixture was diluted with 400 ml. of water. The nearly black crystals of N-methylphenazinium (TCNQF$_4^-$) were collected, washed with water and air-dried. The yield was 4.6 g. Crystallization from 60 ml. of acetonitrile gave 4.3 g. of nearly black crystals of N-methylphenazinium (TCNQF$_4^-$). The electrical resistivity of a compaction at 25° C. was 1 × 10$^{11}$ ohm-cm.

Anal. Calcd. for C$_{25}$H$_{11}$N$_6$F$_4$: C, 63.70%; H, 2.35%; N, 17.83%
Found: C, 63.93%; H, 2.55%; N, 18.08%

EXAMPLE XIII

Preparation of Quinolinium [TCNQ(CN)$_2^-$]

To a suspension of 0.25 g. of 2,5,7,7,8,8-hexacyanoquinodimethan [TCNQ(CN)$_2$] in 20 ml. of acetonitrile was added 0.25 g. of sodium iodide and the reaction mixture was stirred until the yellow crystals of TCNQ(CN)$_2$ disappeared. Water (20 ml.) was added, followed by the addition of 0.2 g. of quinolinium iodide. The reaction mixture was diluted with water, the nearly black crystals were collected, washed with water and, after drying, crystallized from 75 ml. of acetonitrile to give 0.2 g. of black crystals of quinolinium [TCNQ(CN)$_2^-$]. The electrical conductivity of a compaction of quinolinium [TCNQ(CN)$_2^-$] at 25° C. was 2.7 × 10$^7$ ohm-cm.

Anal. Calcd. for C$_{23}$H$_{10}$N$_7$: C, 71.87%; H, 2.62%; N, 25.51%
Found: C, 71.86%; H, 2.96%; N, 25.51%

EXAMPLE XIV

Preparation of [Quinolinium(TCNQF$_4^-$)]$_2$(TCNQF$_4$) quinolinium-(TCNQF$_4$)

To a solution of 1.01 g. (2.5 × 10$^{-3}$ moles) of quinolinium (TCNQF$_4^-$) in 15 ml. of acetonitrile was added a solution of 0.69 g. (2.5 × 10$^{-3}$ moles) of TCNQF$_4$ in 10 ml. of acetonitrile. The resulting solution was filtered and, after cooling to 25° C., was cooled in an ice-water bath. The nearly black crystals of [quinolinium-(TCNQF$_4^-$)]$_2$TCNQF$_4$ were collected and washed with cold acetonitrile followed by ether. The yield was 1.3 g. The electrical resistivity of a compaction of [quinolinium-(TCNQF$_4^-$)]$_2$(TCNQF$_4$) was 5.6 × 10$^6$ ohm-cm.

Anal. Calcd. for C$_{54}$H$_{16}$N$_{14}$F$_{12}$: C, 59.57%; H, 1.48%; N, 18.01%
Found: C, 60.08%; H, 1.38%; N, 18.02%

Examples I–V have illustrated the preparation and properties of several fluoro- and cyano-substituted tetracyanoquinodimethans (or 1,4-bis(dicyanomethylene)-fluoro- and -cyano-substituted cyclohexadienes) and the intermediates thereto. However, the products of this invention also include the specific 1,4-bis(dicyanomethylene)- substituted cyclohexadienes of formula I and intermediates thereto of formula II listed in the following Table I. These compounds can be prepared by the methods of Examples I–V with the specific substituted benzenes listed in the table substituted for the particular substituted benzenes used in Examples I–V and reacted with tertiary butyl malononitrile under the conditions described in those Examples.

transfer compounds having no combined neutral species, and in Table III which includes the complex charge-transfer compounds having combined neutral species.

TABLE I

Preparation of 1,4-bis(dicyanomethylene)-substituted cyclohexadienes

| Coreactant (substituted Benzene) | Intermediate (1,4-bis(alkyldicyanomethyl)-substituted benzene) | Product (substituted tetracyanoquinodimethan) |
|---|---|---|
| Br-C6H2(CN)2-Br | t-Bu-C(CN)2-C6H2(CN)4-C(CN)2-t-Bu | (CN)2C=C6H2(CN)4=C(CN)2 |
| I-C6H2F2-I | t-Bu-C(CN)2-C6H2F2-C(CN)2-t-Bu | (CN)2C=C6H2F2=C(CN)2 |
| F-C6H2(F)(CN)-F | t-Bu-C(CN)2-C6H2(F)(CN)-C(CN)2-t-Bu | (CN)2C=C6H2(F)(CN)=C(CN)2 |
| Cl-C6H2(CN)(F)-Cl | t-Bu-C(CN)2-C6H2(CN)(F)-C(CN)2-t-Bu | (CN)2C=C6H2(CN)(F)=C(CN)2 |
| Cl-C6H2F2-Cl | t-Bu-C(CN)2-C6H2F2-C(CN)2-t-Bu | (CN)2C=C6H2F2=C(CN)2 |
| F-C6H2F2-F | t-Bu-C(CN)2-C6H2F2-C(CN)2-t-Bu | (CN)2C=C6H2F2=C(CN)2 |

Examples VI–XIV have similarly illustrated the charge-transfer compounds of this invention by reference to several charge-transfer compounds of certain substituted tetracyanoquinodimethans with certain Lewis bases. However, the compounds of the invention include all the compounds defined by the general formulas X and XI. Other specific charge-transfer compounds that are included in the invention and which can be made by the procedures of Examples VI–XIV are listed in Table II, which includes the simple charge-

TABLE II

Simple charge-transfer compounds of STCNQ

| Lewis base (or precursor) | Charge-tranfer compound |
|---|---|
| LiI | Li$^+$[(CN)$_2$C=C$_6$F$_2$=C(CN)$_2$]$^-$ |
| KI | K$^+$[(CN)$_2$C=C$_6$F(CN)=C(CN)$_2$]$^-$ |
| NH$_4$I | NH$_4^+$[(CN)$_2$C=C$_6$F$_2$=C(CN)$_2$]$^-$ |
| (C$_4$H$_9$)$_2$NH | (C$_4$H$_9$)$_2$N$^+$[(CN)$_2$C=C$_6$(CN)$_2$=C(CN)$_2$]$^-$ |

TABLE II – Continued

| Lewis base (or precursor) | Charge-transfer compound |
|---|---|
| (C$_6$H$_5$)$_3$P | (C$_6$H$_5$)$_3$P$^+$[(CN)$_2$C=C$_6$F$_4$=C(CN)$_2$]$^-$ |
| CuCN | Cu$^+$[(CN)$_2$C=C$_6$F=C(CN)$_2$]$^-$ |
| FeI$_2$ | Fe$^{+2}$[(CN)$_2$C=C$_6$(CN)$_2$=C(CN)$_2$]$_2^-$ |
| Pyridine | C$_5$H$_5$N$^+$[(CN)$_2$C=C$_6$(CN)$_2$=C(CN)$_2$]$^-$ |
| BaCl$_2$ | Ba$^{+2}$[(CN)$_2$C=C$_6$F(CN)=C(CN)$_2$]$_2^-$ |
| Morpholine hydroiodide | C$_4$H$_8$ON$^+$[(CN)$_2$C=C$_6$F$_2$=C(CN)$_2$]$^-$ |
| CoSO$_4$ | Co$^{+2}$[(CN)$_2$C=C$_6$(CN)$_2$=C(CN)$_2$]$_2^-$ |
| Ce(NO$_3$)$_3$ | Ce$^{+3}$[(CN)$_2$C=C$_6$F$_2$=C(CN)$_2$]$_3^-$ |

TABLE III
Charge-transfer compounds of STCNQ containing combined neutral species

| Lewis base (or precursor) | Charge-transfer compound |
|---|---|
| $(CH_3)_4NCl$ | $(CH_3)_4N^+$ [(CN)$_2$C=⟨F,F / F,F⟩=C(CN)$_2$]$^-$ [(CN)$_2$C=⟨F,F / F,F⟩=C(CN)$_2$] |
| Pyridine | $C_5H_5N^+$ [(CN)$_2$C=⟨F / F⟩=C(CN)$_2$]$^-$ [(CN)$_2$C=⟨F / F⟩=C(CN)$_2$] |
| Quinoline | $C_9H_7N^+$ [(CN)$_2$C=⟨CN / CN⟩=C(CN)$_2$]$^-$ [(CN)$_2$C=⟨CN / CN⟩=C(CN)$_2$] |
| $(C_2H_5)_3\overset{H}{N}Cl$ | $(C_2H_5)_3N^+H$ [(CN)$_2$C=⟨F,CN / CN,F⟩=C(CN)$_2$]$^-$ [(CN)$_2$C=⟨F,CN / CN,F⟩=C(CN)$_2$] |
| $(C_2H_5)(C_6H_5)_3PI$ | $(C_2H_5)(C_6H_5)_3P^+$ [(CN)$_2$C=⟨F / F⟩=C(CN)$_2$]$^-$ [(CN)$_2$C=⟨F / F⟩=C(CN)$_2$] |
| $(CH_3)(C_6H_5)_3AsI$ | $(CH_3)(C_6H_5)_3As^+$ [(CN)$_2$C=⟨CN / CN⟩=C(CN)$_2$]$^-$ [(CN)$_2$C=⟨CN / CN⟩=C(CN)$_2$] |
| $(Cu_2SO_4)$ | $Cu^+$ [(CN)$_2$C=⟨F / F⟩=C(CN)$_2$]$^-$ [(CN)$_2$C=⟨F / F⟩=C(CN)$_2$] |

The fluoro- and cyano-substituted tetracyanoquinodimethans of this invention are all colored compounds which are generically useful as dyes, for instance, as dyes for gasoline, as well as dyes for coloring textiles, threads, films, and the like, by conventional dyeing techniques.

The fluoro- and cyano-substituted tetracyanoquinodimethans of this invention also possess the important advantage over the hitherto known tetracyanoquinodimethan, and its hydrocarbon-substituted derivatives, of being considerably less resistant to reduction. This enables the compounds of this invention to be employed in many applications involving oxidizing conditions. This greater resistance of the dianions derived from the substituted tetracyanoquinodimethans of this invention to oxidation is shown in Table IV which gives the equilibrium potentials of fluoro- and cyano-substituted TCNQ's compared to the corresponding values of unsubstituted TCNQ and certain hydrocarbon-substituted TCNQ's. These equilibrium potentials were measured by chronopotentiometric experiments in acetonitrile containing tetraethylammonium perchlorate using working and auxiliary electrodes of platinum. The reference electrode was AG—/AgNO$_3$ ($10^{-2}$ m) in acetonitrile. The values obtained in these measurements were then converted by standard conversion factor to redox potentials vs. the saturated calomel electrode. All of these processes obey the Nernst equation.

TABLE IV

Redox Potentials of Certain Tetracyanoquinodimethans
Redox Potentials, in Volts, vs.
Saturated Calomel Electrode

| Compound | Equilibrium Potential Between Title Compound and Anion Radical | Equilibrium Potential Between Anion Radical and Dianion |
|---|---|---|
| TCNQF$_4$ | +0.52 | +0.03 |
| TCNQ(CN)$_2$ | +0.61 | +0.07 |
| TCNQ(CN)$_2$F$_2$ | +0.75 | +0.23 |
| TCNQ | +0.13 | −0.29 |
| TCNQ(isopropyl)$_2$ | +0.12 | −0.33 |
| TCNQ(methyl)$_2$ | +0.02 | −0.28 |
| TCNQ(n-propyl) | +0.10 | −0.31 |
| TCNQ(methyl) | +0.12 | −0.26 |

The charge-transfer compounds of this invention, both the simple charge-transfer compounds and those having combined neutral species, having intermediate conductivities are useful in applications such as antistatic agents for fibers and in some semi-conductor applications.

The charge-transfer compounds of the fluoro- and cyano-substituted tetracyanoquinodimethans possess unexpected properties compared to the corresponding charge-transfer compounds of tetracyanoquinodimethan and alkyl-substituted tetracyanoquinodimethans. For example, tetrafluorotetracyanoquinodimethan is more soluble than tetracyanoquinodimethan itself in acetonitrile.

As many apparently widely different embodiments of this invention may be made without departing from the spirit and scope thereof, it is to be understood that this The embodiment of the invention in which an exclusive property or privilege is claimed are defined as follows:

1. A charge transfer composition having the formula

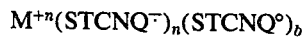

wherein M is a cation, $n$ is the formal positive charge on the cation M, $b$ is a number from 0 to 3 and STCNQ is a compound having the formula

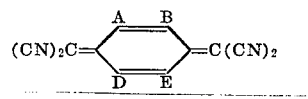

wherein A, B, D and E are the same or different and are hydrogen, fluorine or cyano with the proviso that no more than two of A, B, D and E are hydrogen.

2. The composition of claim 1 wherein A, B, D and E are each fluorine.

3. The composition of claim 2 wherein M is the quinolinium ion, and $n$ is 1.

4. The composition of claim 1 wherein M is the quinolinium ion, and $n$ is 1.

5. The composition of claim 1 wherein $b$ is 0.

6. The composition of claim 5 wherein M is an alkali metal cation and $n$ is 1.

7. The composition of claim 6 wherein said alkali metal is sodium.

8. The composition of claim 5 wherein M is quinolinium and $n$ is 1.

9. The composition of claim 1 wherein $b$ is 0 and A, B, D and E are each fluorine.

10. The composition of claim 10 wherein M is an alkali metal, and $n$ is 1.

11. The composition of claim 10 wherein the alkali metal is sodium.

12. The composition of claim 9 wherein M is tetramethylammonium and $n$ is 1.

13. The composition of claim 9 wherein M is quinolium and $n$ is 1.

14. The composition of claim 9 wherein M is N-methylphenazinium and $n$ is 1.

15. The composition of claim 1 wherein $b$ is 0 and A and E are cyano and B and D are hydrogen.

16. The composition of claim 15 wherein M is quinolinium and $n$ IS 1.

* * * * *

UNITED STATES PATENT OFFICE
CERTIFICATE OF CORRECTION

Patent No. 3,681,353     Dated August 1, 1972

Inventor(s)    Elmore Louis Martin

It is certified that error appears in the above-identified patent and that said Letters Patent are hereby corrected as shown below:

Col. 8, line 10, "2,4,5,6-" should be -- 2,3,5,6- --.

Col. 13, line 43, "2,5-difluoro minutes" is extraneous.

Col. 14, lines 45-47, the superscript "+4" should be -- -4 --.

Col. 16, line 44, "quinolinium- ($TCNQF_4$)" is extraneous.

Col. 20, line 39, "Vo lts" should be -- Volts --.

Signed and sealed this 1st day of May 1973.

(SEAL)
Attest:

EDWARD M. FLETCHER, JR.     ROBERT GOTTSCHALK
Attesting Officer     Commissioner of Patents